United States Patent Office 3,440,217
Patented Apr. 22, 1969

3,440,217
PROCESS FOR CONTROLLING THE CHAIN LENGTH OF POLY(PHENYLENE OXIDES)
Philip D. Faurote, Canoga Park, and Charles L. Segal, Los Angeles, Calif., assignors to North American Rockwell Corporation, a corporation of Delaware
No Drawing. Filed Jan. 11, 1967, Ser. No. 608,498
Int. Cl. C08g 23/18
U.S. Cl. 260—47          1 Claim

ABSTRACT OF THE DISCLOSURE

A novel process for controlling the chain length of poly(phenylene oxides) made by oxidatively coupling the corresponding phenols substituted in at least their 2 or 6-position wherein said process comprises mixing with said corresponding phenols prior to the coupling reaction an amount of a phenol substituted in the 4-position to give the desired chain length poly(phenylene oxide).

---

When a 4-substituted phenol is included as a coreactant in the oxidative polymerization of 2,6-disubstituted phenols, the chain length of the resulting polymers or copolymers varies inversely with the concentration of the included para-substituted phenol.

This invention relates to a method for the control of polymer molecular weight and resulting compositions. More particularly, the invention relates to a method of controlling molecular weight and the resulting polymers and copolymers produced by the oxidative coupling of 2,6-disubstituted phenols.

This invention relates to improvement in controlling the length of chains of phenylene oxide polymers and copolymers which are made by the oxidative coupling technique. The oxidative coupling process has been reported by Alan S. Hay and is described in detail in French Patent No. 1,234,336. The oxidative coupling method involves reacting a suitable phenol with oxygen in the presence of a copper/amine catalyst. The reaction can be carried out in a tertiary amine which serves both as a component of the catalyst and as a solvent for the reaction mixture. Solvents in which the resultant polymer is soluble, such as benzene, toluene, nitrobenzene and the like may also be used; and, as well, polymer nonsolvents such as ketones, ethers, alcohols, and the like, may be used. Oxygen is then bubbled through the reaction mixture. An exothermic reaction transpires and as indicated in the general stoichiometric formula for the reaction water becomes a byproduct.

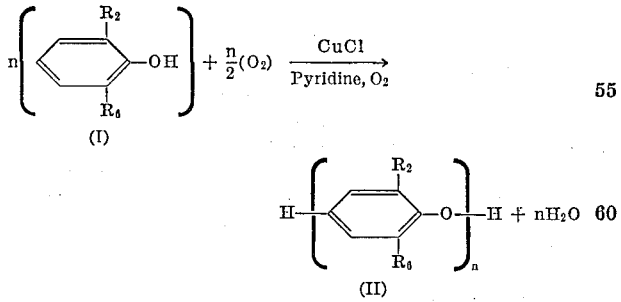

where $R_2$ and $R_6$ are individually selected from class consisting of $CH_3$, —$C_2H_5$, —$C_3H_7$, $CH_2$=$CHCH_2$—, $CH_2$=$CH$—, halogens, with a total of not more than 6 carbon atoms. Particularly preferred is when $R_2$ and $R_6$ are both methyl. It should be noted that a similar backbone has been described by Staffin and Price [J.A.C.S. 82, 3632 (1960)]. However, the polymerization process and product described by Hay differ in that no bromine is present in the para position in the starting phenol and thus none is present in the finished product. This is because the oxidative coupling described herein is a different approach to the formation of polyphenylene oxides than the method disclosed by Staffin and Price. The approach used by Staffin involved the oxidative displacement of bromine from the bromine substituted corresponding phenol. In addition to the poly(phenylene oxide) described by Hay, as previously indicated, this invention also relates to the control of molecular weight of the peculiar type of phenylene oxide polymers and copolymers which include ortho-alkenyl substituents as disclosed in copending application Ser. No. 327,048, filed Nov. 29, 1963, by the same inventors. The control of molecular weight of such polymers and copolymers is an essential feature to their useful application; high molecular weights being important to mechanical strength and fiber-forming ability, while lower molecular weights, within limits, will improve the flow and moldability of the polymer.

While high molecular weights have been made possible by the oxidative coupling technique as set forth by Hay, practical and economic methods of obtaining controlled molecular weight have not been described. For example, it has been found that the molecular weight of poly(2,6-dimethylphenylene oxide) increased as the concentration of monomer increased, all other reaction conditions being the same. Also, polymer molecular weight increased quite slowly during the initial part of the polymerization and increased rapidly near the end of the polymerization. In addition, it was found that monomer is present until the last stages of the polymerization. Therefore, control of molecular weight by reducing initial monomer concentration or by stopping the reaction before completion is neither practical nor economical. The use of a non-solvent in the reaction mixture, such as alcohol, causes the polymer to separate when a certain molecular weight is reached. However, the solvent/nonsolvent system is constantly changing during the polymerization thus precluding the removal of a uniform molecular weight fraction. Thus, the previously described methods for controlling the molecular weight are not precise, require close scrutiny during processing, and often result in complications in the overall processing technique due to the interrelation of one variable with another in the overall procedure for making the materials.

Unexpectedly, it has been found that when a 4-substituted phenol is included as a coreactant in an otherwise standard oxidative coupling of a 2,6-disubstituted phenol the molecular weight or chain length of the resulting polymer varies inversely with the concentration of the added 4-substituted phenol. The contemplated phenols to be added to control the chain length have the following general formula:

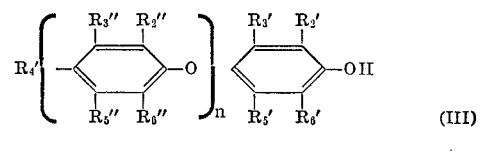

where $n$ is from 0 to 1000:

$R_2'$, $R_6'$, $R_2''$ and $R_6''$ are individually selected from the class consisting of H, $CH_3$, $C_2H_5$, $CH$=$CH_2$, $C_3H_7$, $CH_2CH$=$CH_2$, $C_4H_9Cl$, Br, I, $CH_2Cl$, $CH_2Br$, $CH_2I$, $C_2H_4Cl$, $C_2H_4Br$, $C_2H_4I$;

$R_3'$, $R_5'$, $R_3''$ and $R_5''$ are individually selected from the class consisting of H, $CH_3$, $C_2H_5$, $CH$=$CH_2$, $C_3H_7$, $CH_2CH$=$CH_2$, $C_4H_9$, Cl, Br, I, $CH_2Cl$, $CH_2Br$, $CH_2I$, $CH_2OH$, $C_2H_4Cl$, $C_2H_4Br$, $C_2H_4I$, $NO_2$, COOH, and/or esters and ketones of from 2 to 5 carbon atoms.

$R_4'$ is selected from the class consisting of $C_2H_5$, $CH_3$, $CH_2Br$, $CH_2Cl$, $CH_2I$, COOH, $CH=CH_2$, $C_3H_7$, $$CH_2CH=CH_2$$

$C_4H_9$, $NO_2$ $CH_2OH$, and/or esters and ketones of from 2 to 5 carbon atoms.

The preferred compound of the invention which has given outstanding results is 2,4,6-trimethylphenol (mesitol). Additional examples of particular compounds found within the generic formula above, which will satisfactorily operate as chain terminators include, for example, 4-allylphenol, para-cresol, para-hydroxystyrene, 2,4-diethylphenol, nonylphenol, octylphenol, 2,4-dimethylphenol, tyrosine, 2-methyl-4-allylphenol, p-hydroxy benzoic acid and salts thereof, 2-allyl-4-methylphenol, p-hydroxyl benzyl alcohol, p-hydroxybenzene sulfonic acid, 2,6-dimethyl-4-allylphenol, euginol, 2,4,6-tributylphenol, 2,6-dibutyl-4-methylphenol, 2,6 - dimethyl-4-butylphenol, 2,6-dimethyl-4-(4'-methylphenoxy)phenol, 2,6-dimethyl-4-(2',4'-dimethylphenoxy)phenol, 2,6 - dimethyl-4-(2',4', 6'-trimethylphenoxy)phenol, 2,6-dimethyl-4-(4'-allylphenoxy)phenol, 2,6 - dimethyl-4-[2',6'-dimethylphenoxy-4'-(2",4",6"-trimethylphenoxy)]phenol.

Designating the chain length controlling agent for this invention as above, utilizing for example 2,6-dimethylphenol as starting monomer for the oxidative coupling to form a polymer, the resultant material will appear as follows:

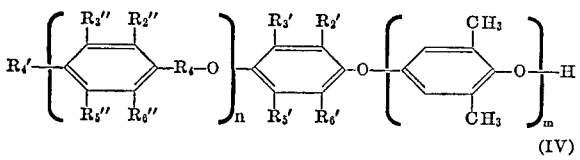

(IV)

where $m=1$ to over 1000 and $n$ is as previously defined. Above it can be seen that the compound of this invention designated as structure (III) terminates one end of the polymer chain formed.

The results are particularly unexpected in view of the statements of Hay as relates to the polymerizability of 4-substituted phenols which have ortho positions unsubstituted. It has been found that the presence of a 4-position substitutent in a phenol is sufficient to prevent polymerization of that phenol under the conditions of the present invention. As can be seen above, the amount of chain terminator can vary from 0.1 to 50 percent of the total composition of polymer.

To indicate the effect of the ratio of chain stopper to polymer as affecting the molecular weight, reference is had to the intrinsic viscosity of a poly(2,6-dimethylphenylene oxide) prepared under the standard conditions previously mentioned. The resultant homopolymer has an intrinsic viscosity of 0.82 dl./g. (benzene, 25° C.) which corresponds to a molecular weight of about 37,000. When the oxidative coupling of the same 2,6-dimethylphenol was run in the presence of 10 mole percent of 2,4,6-trimethylphenol as a chain stopper, the molecular weight was found to be 2800. This resultant figure is compared to a theoretical value of 1200 based on a monomolecular termination or 2400 based on a bimolecular termination mechanism. As will be shown in the following examples, other polymerizations run with varying concentrations of the 4-substituted phenol give similar results with a molecular weight of the final product varying inversely to the concentration of the 4-substituted phenol.

EXAMPLE 1

To a 100 ml. reaction kettle equipped with a Vibromixer, addition funnel, and oxygen buret was added 10 ml. of the solvent nitrobenzene and 9 ml. of the tertiary amine pyridine containing 0.10 gram ($1\times10^{-3}$ moles) cuprous chloride. Additional 20 ml. of nitrobenzene containing 0.78 gram (0.0065 mole) of the monomer 2,6-dimethylphenol and 0.103 gram (0.000755 mole) of 2,4,6- trimethylphenol (mesitol) was placed in the addition funnel and the reaction vessel was immersed in a 30° C. thermostated water bath. Oxygen was passed into the vigorously stirred mixture of Cu(I)/pyridine for 30 minutes and the system was closed; the monomer solution was added, and the reaction was allowed to proceed for 34 minutes at which time oxygen was no longer being absorbed. The catalyst was deactivated and the polymer precipitated by adding the reaction mixture to 100 ml. of rapidly stirred methanol containing 3.5 percent HCl. The resultant polymer was filtered, washed, dried, and solution viscosity, yield, and fusion characteristics of the polymer were determined: intrinsic viscosity in benzene at 25° C., 0.14 dl./g.; softens at 200–225° C.; yield, 80.0 percent. The infrared spectra of this polymer was identical to the polymer prepared in the absence of 2,4,6-trimethylphenol, and which had the following characteristics: intrinsic viscosity, 0.82 dl./g.; yield, 92.7 percent; softening characteristic, >300° C. A series of polymers prepared as above containing varying amounts of 2,4,6-trimethylphenol are listed in Table I. The effect of the chain terminators can be seen: as amounts increase the viscosity decreases.

TABLE I.—CONTROL OF MOLECULAR WEIGHT IN THE OXIDATIVE COUPLING OF 2,6-DIMETHYLPHENOL USING MESITOL

| Mole percent 2,4,6-trimethylphenol | Intrinsic viscosity, dl./g. (benzene, 25° C.) | Fusion range, ° C. |
| --- | --- | --- |
| ≥0.1 | 0.82 | >300 |
| 1 | 0.47 | 250–275 |
| 2 | 0.33 | |
| 5 | 0.21 | 235–240 |
| 10 | 0.14 | 200–225 |
| 30 | 0.07 | 160–165 |

EXAMPLE 2

A 50/50 copolymer of 2,6-dimethylphenol (160.8 grams, 1.32 moles) and 2-allyl-6-methylphenol (214.2 grams, 1.32 moles) was prepared by a procedure similar to that described in Example 1 and including 35.1 grams (8.6 moles percent) 2,4,6-trimethylphenol. The resulting copolymer was obtained in 82.7 percent yield, fused at about 175° C. and had an intrinsic viscosity of 0.12 dl./g. (benzene, 25° C.). A comparison with other copolymers in this series is shown in Table II.

TABLE II.—MESITOL AS A METHOD OF CONTROLLING MOLECULAR WEIGHT IN PHENYLENE OXIDE COPOLYMERS

| Mole percent 2,4,6-trimethylphenol | Intrinsic viscosity ($\eta$), dl./g. (benzene, 25° C.) | Fusion range, ° C. |
| --- | --- | --- |
| 0 | 0.16 | 195–200 |
| 8.6 | 0.12 | 175–180 |
| 11.9 | 0.09 | 155–160 |

EXAMPLE 3

Using a procedure similar to that of Example 1, 8.82 grams (0.072 mole) 2,6-dimethylphenol, and 1.30 grams (0.008 mole), i.e., about 10 mole percent of 2.6-dimethyl-4-allylphenol were polymerized together. The polymer so produced was isolated in a yield of 80 percent, and exhibited a solution viscosity of 0.13 dl./g., (benzene, 25° C.). This result may be compared to the polymers of Example 1.

EXAMPLE 4

A mixture of 300 ml. nitrobenzene, 90 ml. pyridine, 0.4 gram CuCl. 12.0 grams $MgSO_4$ was bubbled with $O_2$ for 30 minutes. To this was added 36.3 grams of the monomer, 2,6-dimethylphenol (0.298 mole) and 1.9 grams of the coreactant chain terminating agent, 2,4-dimethylphenol (0.0156 mole); the mixture was reacted 24 hours at 18–24° C. with mechanical stirring. The resulting polymer was obtained in 90.0 percent yield. Intrinsic viscosity was 0.22 dl./g. (benzene, 25° C.) and fusion range was 225–230° C. In the absence of 2,4-dimethylphenol the polymer had the following characteristics: intrinsic viscosity 1.24 dl./g., fusion range >300° C. By analogy when 5 mole percent 2,4,6-trimethylphenol replaced the 2,4-dimethylphenol, the product had an intrinsic viscosity of 0.21 dl./g. and a fusion range of 235–240° C.

EXAMPLE 5

300 ml. of nitrobenzene, 90 ml. of pyridine, 0.4 gram of CuCl, 12.0 grams of $MgSO_4$, 37.12 grams (0.304 mole) of 2,6-dimethylphenol, 1.79 grams (0.0121 mole) of 4-allyl-2-methylphenol, were reacted for 5 hours with mechanical stirring. An intrinsic viscosity of 0.23 dl./g. was obtained with a fusion range 245–250° C., 94 percent yield. The coreactant chain terminator corresponds to 3.8 mole percent and may be compared with results of Table I.

EXAMPLE 6

A mixture of 300 ml. of nitrobenzene, 90 ml. of pyridine, 0.96 gram CuCl and 9.75 grams anhydrous magnesium sulfate was bubbled with oxygen for 30 minutes. To this catalytic mixture was added 8.55 grams (0.0702 mole) of 2,6-dimethylphenol and 0.842 grams (0.0078 mole) of 4-methylphenol, and the reaction was allowed to proceed until oxygen was no longer absorbed. The resulting product, after precipitation and workup had the following characteristics: intrinsic viscosity $[\eta]$ 0.15=dl./g.; yield, 75 percent; fusion range 205–210° C. This may be compared with the results of Table I.

EXAMPLE 7

50/50 copolymers of the type described in Example 2 were prepared with varying amounts of the 4-substituted phenol, 2-methyl-4-allylphenol. As can be seen from Table III the molecular weight of the resulting copolymers is proportionally reduced by the introduction of the 4-substituted coreactant.

TABLE III.—2-METHYL-4-ALLYLPHENOL AS A CHAIN TERMINATOR FOR 50/50 COPOLYMERS OF 2,6-DIMETHYL-PHENOL AND 2-ALLYL-6-METHYLPHENOL

| Total percent 4-substituted phenol | $[\eta]$ dl./g. | Yield percent | Fusion range, ° C. |
|---|---|---|---|
| 0.5 | 0.29 | 97.9 | 215–220 |
| 3.6 | 0.17 | 94.5 | 195–200 |
| 6.8 | 0.12 | 93.5 | 165–170 |
| 15.0 | 0.09 | 72.0 | 155–160 |

EXAMPLE 8

Copolymers of 75 mole percent 2,6-dimethylphenol and 25 mole percent 2-allyl-6-methylphenol were prepared using varying amounts of the molecular weight control agent, 2-methyl-4-allylphenol. Results are shown in Table IV:

TABLE IV.—2-METHYL-4-ALLYLPHENOL AS A MOLECULAR WEIGHT CONTROL AGENT FOR A 75/25 COPOLYMER OF 2,6-DIMETHYLPHENOL AND 2-ALLYL-6-METHYLPHENOL

| Mole percent 4-substituted phenol | $[\eta]$ dl./g. | Yield, percent |
|---|---|---|
| 1.8 | 0.29 | 82.5 |
| 4.5 | 0.21 | 86.9 |
| 5.7 | 0.16 | 86.9 |

Although the invention has been described and illustrated in detail, it is to be clearly understood that the same is by way of illustration and example only and is not to be taken by way of limitation, the spirit and scope of this invention being limited only by the terms of the appended claim.

We claim:
1. In the process of forming substituted phenylene oxide homopolymers and copolymers by oxidative coupling of the corresponding phenols wherein said corresponding phenols are selected from a group consisting of phenols substituted in the 2-position, 6-position 2,6- the improvement which comprises:
   controlling the chain length of the polymers formed by
   mixing with said starting phenols prior to reaction a 4-substituted phenol wherein said 4-substituted phenol has in its 4-position a member selected from a group consisting of lower alkyl and lower alkenyl and in its 2 and 6-positions a member selected from a group consisting of hydrogen, lower alkyl and lower alkenyl,
   the amount of 4-substituted phenol being selected in accordance with the desired molecular weight of said polymer.

References Cited

UNITED STATES PATENTS 3,306,875  2/1967  Hay _____ 260—47

OTHER REFERENCES

Moore: Polymer Chemistry, Chicago, Alline Pub. Co., 1963 (p. 25 relied on).

WILLIAM H. SHORT, *Primary Examiner.*

M. GOLDSTEIN, *Assistant Examiner.*

PO-1050
(5/69)

UNITED STATES PATENT OFFICE
CERTIFICATE OF CORRECTION

Patent No. 3,440,217      Dated April 22, 1969

Inventor(s) Philip D. Faurote and Charles L. Segal

It is certified that error appears in the above-identified patent and that said Letters Patent are hereby corrected as shown below:

Claim 1, line 26, should read:
phenols substituted in the 2-position, 6-position ---and--- 2,6- --positions-- the

SIGNED AND
SEALED
DEC 23 1969

(SEAL)
Attest:

Edward M. Fletcher, Jr.
Attesting Officer

WILLIAM E. SCHUYLER, JR.
Commissioner of Patents